(12) United States Patent
Kim et al.

(10) Patent No.: US 11,056,960 B2
(45) Date of Patent: Jul. 6, 2021

(54) TACTILE ACTUATOR

(71) Applicant: CK MATERIALS LAB CO., LTD., Seoul (KR)

(72) Inventors: Hyeong Jun Kim, Seoul (KR); Jong Hyung Jung, Seoul (KR); Jong Hun Lee, Seoul (KR); Nam Seok Kim, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

(21) Appl. No.: 16/348,126

(22) PCT Filed: Nov. 8, 2017

(86) PCT No.: PCT/KR2017/012573
§ 371 (c)(1),
(2) Date: Jun. 3, 2019

(87) PCT Pub. No.: WO2018/088788
PCT Pub. Date: May 17, 2018

(65) Prior Publication Data
US 2019/0363622 A1      Nov. 28, 2019

(30) Foreign Application Priority Data

Nov. 8, 2016   (KR) .................. 10-2016-0148360
Nov. 6, 2017   (KR) .................. 10-2017-0146812

(51) Int. Cl.
*G06F 3/01*     (2006.01)
*H02K 33/16*    (2006.01)

(52) U.S. Cl.
CPC ............... *H02K 33/16* (2013.01); *G06F 3/01* (2013.01); *G06F 2203/014* (2013.01)

(58) Field of Classification Search
CPC ............ H02K 33/16; G06F 3/016; G06F 3/01
See application file for complete search history.

(56) References Cited

U.S. PATENT DOCUMENTS

2004/0160415 A1*  8/2004  Rosenberg ............. G05G 9/047
                                                345/156
2007/0140509 A1*  6/2007  Ueno .................... H05K 3/301
                                                381/96

(Continued)

FOREIGN PATENT DOCUMENTS

CN      100998977      7/2007
JP      09-205763 A    8/1997

(Continued)

OTHER PUBLICATIONS

Search Report issued by the Korean Intellectual Property Office (KIPO) dated Feb. 26, 2018 for International Application PCT/KR2017/012573.

(Continued)

*Primary Examiner* — Alexander Eisen
*Assistant Examiner* — Cory A Almeida
(74) *Attorney, Agent, or Firm* — Mayer & Williams, PC; Stuart H. Mayer (57) ABSTRACT

A tactile actuator, according to one embodiment, may comprise: a housing defining an accommodation space therein; an upper case for covering the upper part of the accommodation space; a vibration unit arranged inside the accommodation space; an upper elastic member connecting the upper side of the housing and the vibration unit; a lower elastic member for connecting the lower side of the housing and the vibration unit; and a coil for forming a magnetic field to drive the vibration unit, wherein one end of the upper elastic member may be fixed to a position on a side wall of the housing that is apart from the upper case.

12 Claims, 11 Drawing Sheets (56) References Cited

U.S. PATENT DOCUMENTS

2007/0182257 A1* 8/2007 Miura .................... B06B 1/045
                                                    310/15
2010/0127581 A1   5/2010 Yun et al.
2012/0169153 A1* 7/2012 Ueda ..................... H02K 33/16
                                                    310/25

FOREIGN PATENT DOCUMENTS

| JP | 2013-104967 A | 5/2013 |
|----|---------------|--------|
| KR | 10-2005-0033358 A | 10/2003 |
| KR | 10-2005-0005596 A | 1/2006 |
| KR | 10-2005-0122101 A | 6/2006 |
| KR | 10-2006-0100578 A | 7/2007 |
| KR | 10-2008-0107506 A | 6/2009 |
| KR | 10-2010-0058338 A | 6/2010 |
| KR | 10-2011-0107671 A | 10/2011 |
| KR | 10-2013-0105173 A | 9/2013 |
| KR | 1020150053106 | 5/2015 |

OTHER PUBLICATIONS

Dahiya, Ravinder S., et al., "Tactile Sensing—From Humans to Humanoids," IEEE Transactions on Robotics, vol. 26(1), Feb. 2010, pp. 1-20.

\* cited by examiner

| Type | Graph | Characteristic |
|---|---|---|
| A |  | Recognized as tapping |
| B |  | Not recognized as tapping |

FIG. 11

| Type | Graph | Characteristic |
|---|---|---|
| A (10Hz) |  | Recognized as tapping |
| B (15Hz) |  | Recognized as tapping |
| C (20Hz) |  | Recognized as normal vibration |

TACTILE ACTUATOR

TECHNICAL FIELD

One or more example embodiments relate to a tactile actuator.

BACKGROUND ART

Formerly, information was exchanged between electronic devices and humans mainly through visual or auditory transmission. Recently, haptic technology is emerging as technology for transmitting more specific and realistic information.

In general, a linear resonant actuator (LRA), which maximizes an intensity of vibration using a resonance frequency generated by the body of weight connected to the magnetic circuit and an elastic spring, is widely used as a haptic device for haptic technology.

Such LRA may include a housing part having an upper portion and a lower portion as a member forming an appearance, a vibrating part including a magnet and a yoke structural weight, elastic parts located at top and bottom surface to support the vibrating part, and a coil part generating an electromagnetic force.

In related arts, a linear resonance actuator is disclosed in Korean Patent Publication No. 2005-0122101 (entitled as "A VERTICAL VIBRATOR"). Also, a device for obtaining a stable linear vibration is disclosed in Korean Patent Application No. 2007-0055338 (entitled as "LINEAR VIBRATION GENERATOR").

A structure in which an elastic portion is installed on an upper and lower surfaces of a vibrator is disclosed in in Korean Patent Publication No. 2005-0005596 (entitled as "VIBRATOR STRUCTURE").

A typical linear resonance actuator may have a disadvantage in that effective vibration can be achieved only by using a resonance frequency determined by a weight body and an elastic member in order to transmit a simple vibration.

Furthermore, according to the paper (entitled Tactile Sensing—From Humans to Humanoids) published in the world-wide journal, IEEE TRANSACTIONS ON ROBOTICS of 2010, a frequency of a tactile sense acceptable to a human body ranges from 0.4 hertz (Hz) to 500 Hz. However, when the existing haptic technology is used, only vibration within the range of 160 Hz to 210 Hz may be provided, and thus more diverse and complex information may not be transmitted effectively. To solve the above issue effectively, research on an apparatus for effectively transmitting a tactile signal within various frequency ranges is needed.

The existing haptic devices may seem to solve the above issue by widening a bandwidth of an operating frequency to provide vibration efficiently. However, during a vertical vibration, a vibrating part contacts an outer housing to generate noise and a coil part is frequently disconnected.

In addition, there is no apparatus that may have a resonance frequency of at most 170 Hz and provide a tactile sense including vibration at an ultra-low frequency below 20 Hz.

Thus, there is a need for developing an apparatus that may have at least one resonance frequency in a region below 170 Hz, provide a new tactile sense that is represented by various movements through an electrical signal of an input waveform different from that of a resonance frequency band in an ultra-low frequency (below 20 Hz), vibrate in various ranges instead of vibrating at simply a single frequency region, and provide various tactile senses through various movements of an ultra-low frequency band.

DISCLOSURE OF INVENTION

Technical Goals

An aspect provides a tactile actuator.

Technical Solutions

According to an aspect, there is provided a tactile actuator including a housing having an accommodation space therein, an upper case configured to cover an upper portion of the accommodation space, a vibrator disposed in the accommodation space, an upper elastic member configured to connect an upper side and the vibrator, and a coil configured to form a magnetic field to drive the vibrator, wherein one end portion of the upper elastic member is fixed at a position spaced apart from the upper case on a side wall of the housing.

The tactile actuator may further include a lower elastic member configured to connect a lower side of the housing and the vibrator. The vibrator may include a mass body vertically connecting the upper elastic member and the lower elastic member, and having a magnetic property, a magnetic portion provided at a center of a lower side of the mass body, and a pole piece attached to a bottom surface of the magnetic portion.

The mass body may include a first stepped portion downwardly recessed from an edge of a top surface of the mass body and a second stepped portion downwardly recessed from the first stepped portion. The upper elastic member may include an upper elastic fixer fixed to the upper side of the housing: an upper elastic support fit into the first stepped portion, and an upper elastic connector configured to connect the upper elastic fixer and the upper elastic support.

The upper elastic fixer may be spaced apart from the upper case by a distance greater than a thickness of the upper case.

When the mass body reaches a maximum height, the second stepped portion may not be interfered with by the upper elastic connector.

The mass body may further include a third stepped portion upwardly recessed from an edge of a bottom surface of the mass body. The lower elastic member may include a lower elastic fixer fixed to the lower side of the housing, a lower elastic support fit into the third stepped portion, and a lower elastic connector configured to connect the lower elastic fixer and the lower elastic support.

When the mass body reaches a minimum height, the third stepped portion may not be interfered with by the lower elastic connector.

The upper elastic fixer may be spaced apart from the upper case by a distance greater than a thickness of the upper case.

A natural vibration frequency of the tactile actuator may be 100 hertz (Hz) to 170 Hz.

The tactile actuator may further include a controller configured to determine an operation mode among a plurality of preset operation modes and determine a characteristic of a current to be applied to the coil based on the operation mode. The operation mode may include a normal vibration mode and a tapping mode. When the operation mode is the normal vibration mode, the controller may apply a sine wave having a frequency between 50 Hz and 170 Hz to the coil.

When the operation mode is the tapping mode, the controller may apply a square wave having a frequency of 1 Hz or more and less than 20 Hz to the coil.

In the tapping mode, a cumulative impulse of the vibrator may be 3 mNs or more within an interval of 50 milliseconds (ms).

A magnitude of an amplitude of a vibrating force of the vibrator may vary over time. A minimum time interval, in which a difference in height between peak points of the amplitude of the vibrating force of the vibrator is greater than 0.1 G, may be greater than a minimum time in which a person distinguishes two stimuli at a fingertip.

According to another aspect, there is also provided a tactile actuator including a housing having an accommodation space therein, an upper case configured to cover an upper portion of the accommodation space, a vibrator disposed in the accommodation space, an elastic member connecting the housing and the vibrator, a coil configured to form a magnetic field to drive the vibrator, and a controller configured to apply a current to the coil and determine a characteristic of a current to be applied, wherein when the controller applies a square wave having a frequency between 1 Hz to 20 Hz, a cumulative impulse of the vibrator is 3 mNs or more within an interval of 50 milliseconds (ms).

Effects

According to example embodiments, it is possible to provide a flexible tactile actuator including a vibrator connecting an upper elastic member and a lower elastic member at a top surface and a bottom surface, thereby achieving a structural stability, increasing a vibration force, and reducing noise in vibration.

According to example embodiments, it is possible to provide a flexible tactile actuator in which an upper elastic member connected to an upper side of a vibrator does not interfere with an upper surface of a case during vibration, thereby preventing noise occurrence.

According to example embodiments, it is possible to provide a flexible tactile actuator that inputs different waveforms in an ultra-low frequency band to provide a tactile sense of tapping different from a normal vibration.

According to example embodiments, it is possible to provide a flexible tactile actuator that provides an impulse greater than a minimum impulse to be recognized by a person, within a minimum time for the person to distinguish two stimuli, thereby providing a tactile sense of movement different from a normal vibration, for example, tapping to a user.

BEST MODE FOR CARRYING OUT THE INVENTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1:
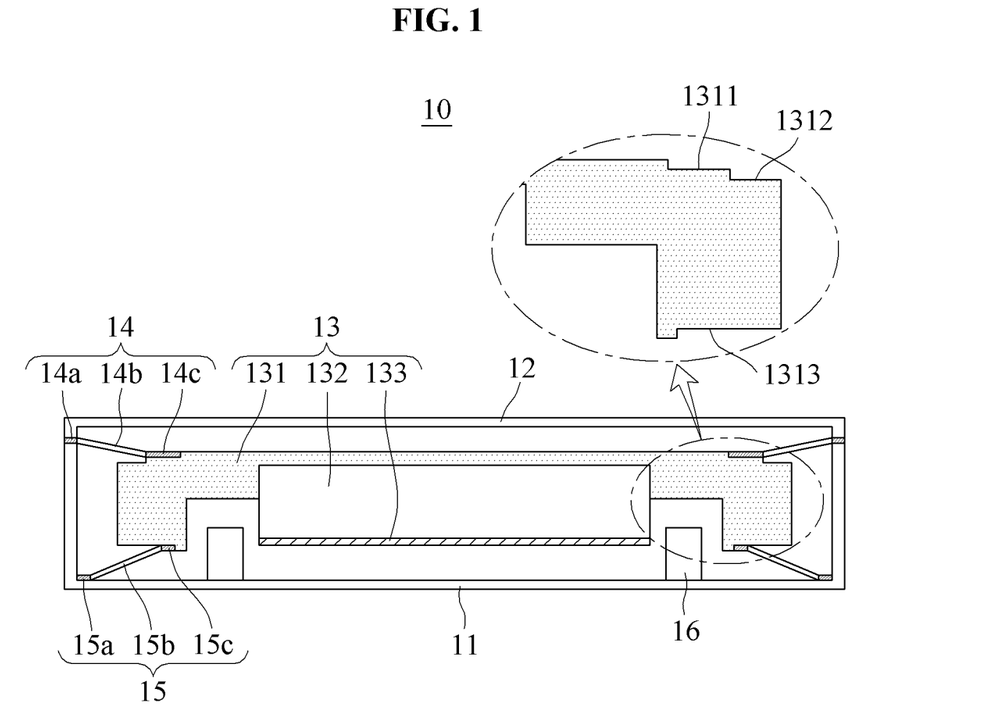
FIG. 1 is a cross-sectional view illustrating a tactile actuator according to an example embodiment.
Figure 2:
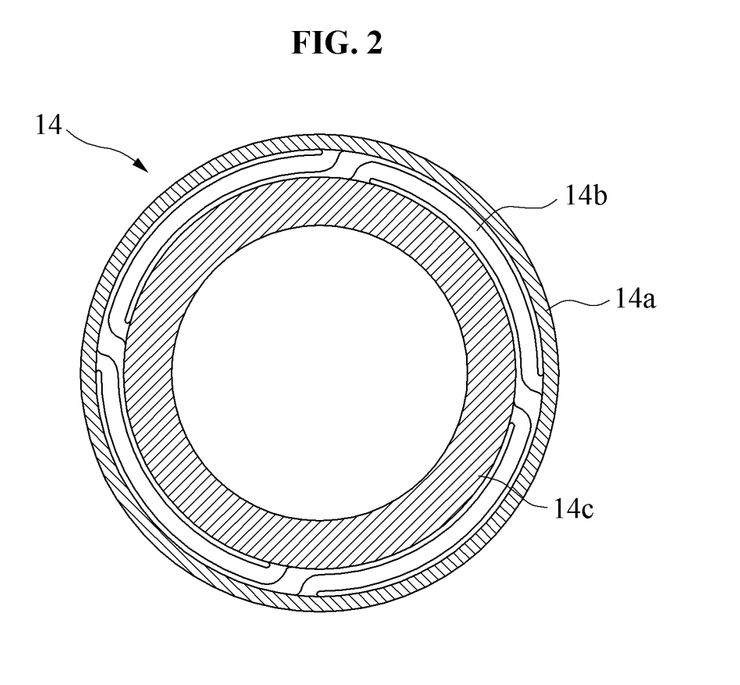
FIG. 2 is a diagram illustrating an upper elastic member according to an example embodiment.
Figure 3:
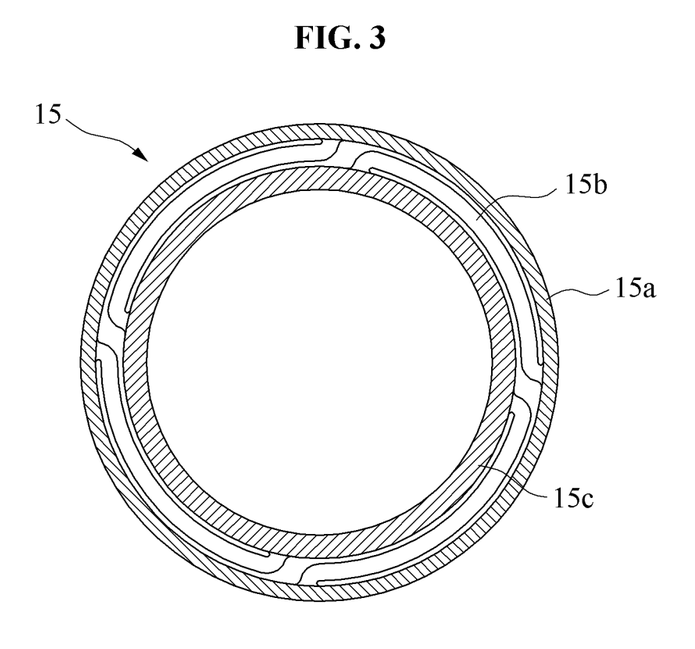
FIG. 3 is a diagram illustrating a lower elastic member according to an example embodiment.

FIG. 1 is a cross-sectional view illustrating a tactile actuator according to an example embodiment, FIG. 2 is a diagram illustrating an upper elastic member according to an example embodiment, and FIG. 3 is a diagram illustrating a lower elastic member according to an example embodiment.

Referring to FIGS. 1 through 3, a tactile actuator 10 may include a housing 11, an upper case 12, a vibrator 13, an upper elastic member 14, a lower elastic member 15, a coil 16, and a controller. The upper elastic member 14 and the lower elastic member 15 may collectively be referred to as "elastic member". Although the tactile actuator 10 having dual elastic members is illustrated, only one of the upper elastic member 14 and the lower elastic member 15 may be embodied in the tactile actuator 10.

The housing 11 may be a case that forms an appearance of the tactile actuator 10 and may have various shapes such as a hexahedral shape and a cylindrical shape.

For example, the housing 11 may have an open top and an inner space in which the vibrator 13, the upper elastic member 14, the lower elastic member 15, and the coil 16 are accommodated. The housing 11 may be made of, for example, a stainless steel.

The upper case 12 may be a case that covers the top of the housing 11. The housing 11 may be sealed from an outside by covering the top with the upper case 12.

The vibrator 13 may vertically move by a magnetic field generated by the coil 16 in the inner space of the housing 11 so as to drive the tactile actuator 10 to provide at least one tactile sense to a user. The vibrator 13 may include a mass body 131, a magnetic portion 132, and a pole piece 133.

The mass body 131 may have, for example, a circular shape when viewed from above and include the magnetic portion 132 at a bottom surface. For example, the mass body 131 may be spaced from the housing 11 and the upper case 12. Also, the mass body 131 may be supported by the upper elastic member 14 from an upper side and supported by the lower elastic member 15 from a lower side, thereby moving vertically in the housing 10.

For example, the mass body 131 may be made of a steel, a powder, an alloy, an alloy powder, a composite or a nanostructure including at least one of Fe, Co, Si, Nd, Ni, B, Mn, Zn, Cu, and W having a magnetic property, and may include a material magnetized such that an N pole and an S pole are distinguished vertically.

As illustrated in FIG. 1, an intermediate are including a center portion of the bottom surface of the mass body 131 may be upwardly recessed from the bottom surface. The magnetic portion 132 may be disposed in the recessed portion.

The mass body 131 may include a first stepped portion 1311 and a third stepped portion 1313 recessed from edges of a top surface and a bottom surface of the mass body 131 in order to be connected to the upper elastic member 14 and the lower elastic member 15. The mass body 131 may further include a second stepped portion 1312 downwardly recessed from the first stepped portion 1311.

As illustrated in FIG. 1, the first stepped portion 1311 may be a stepped portion downwardly recessed from an edge of the mass body 131 to accept the upper elastic support 14c of the upper elastic member 14. In other words, the first stepped portion 1311 may be a first groove bent from a center portion of the top surface of the mass body 131.

The first stepped portion 1311 may allow an upper elastic support 14c of the upper elastic member 14 to be connected to the first stepped portion 1311 and support a vertical movement of the mass body 131.

The second stepped portion 1312 may be a stepped portion recessed again from an outer portion of the edge when compared to the first stepped portion 1311, and may be a second groove bent from the center portion of the top surface of the mass body 131.

When the mass body 131 is connected to the upper elastic member 14 and rises to a maximum, the second stepped portion 1312 may allow an upper elastic connector 14b of the upper elastic member 14 not to be in contact with or interfered with by the mass body 131.

The third stepped portion 1313 may be a stepped portion that is upwardly recessed from a bottom surface edge of the mass body 131 such that a lower elastic support 15c is disposed at the bottom surface of the mass body 131.

The third stepped portion 1313 may allow the lower elastic support 15c of the lower elastic member 15 to be connected to the third stepped portion 1313 and support a vertical movement of the mass body 131.

The first stepped portion 1311 and the third stepped portion 1313 may allow the upper elastic member 14 and the lower elastic member 15 to be formed symmetrically. In this example, one ends of the upper elastic member 14 and the lower elastic member 15 may be fixed to the housing 11. Also, the other ends of the upper elastic member 14 and the lower elastic member 15 may be connected to the first stepped portion 1311 and the third stepped portion 1313, respectively. Through this, centers of the mass body 131 and the magnetic portion 132 may be aligned with the center of the housing 11.

The magnetic portion 132 may be inserted and fixed in the center portion recessed from the bottom surface of the mass body 131. The magnetic portion 132 may move by the magnetic field generated in the coil 16 and move together with the mass body 131 to which the magnetic portion 132 is fixed, so that a movement of the vibrator 13 is implemented.

The magnetic portion 132 may be provided as a permanent magnet. For example, the magnetic portion 132 may be a ferrite-based permanent magnet including at least one of iron, nickel, and cobalt. Also, the magnetic portion 132 may be a permanent magnet including at least one of rare earth elements such as samarium and neodymium.

When the magnetic portion 132 is a neodymium magnet, a neodymium magnet having a BH_MAX rating of N50 may be used.

The pole piece 133 may be disposed on the bottom surface of the magnetic portion 132 and minimize a leakage of magnetic force of the magnetic portion 132 to an outside. Also, a cushion portion such as a sponge acting as a damper may be provided between the pole piece 133 and the magnetic portion 132 and/or on the bottom surface of the pole piece 133 to protect the magnetic portion 132 from external shocks that may occur when the magnetic portion 132 directly collides with the housing 11.

The upper elastic member 14 may be an elastic body connecting and supporting the upper side of the mass body 131 to allow a vertical vibration of the mass body 131. For example, to stably support the mass body 131, the upper elastic member 14 may have one end connected along a circumference of the top surface of the mass body 131 and another end connected along a circumference of an inner surface of the housing 11.

The upper elastic member 14 may have a circular shape with an empty central portion, and may be formed to be inclined in a vertical direction from one end of the edge to the other end of an opposite side. The upper elastic member 14 may include an upper elastic fixer 14a, the upper elastic support 14c, and the upper elastic connector 14b.

As illustrated in FIG. 1, in the housing 11, the upper elastic fixer 14a may be fixed to the upper side of a side wall of the housing 11 and connected to the upper elastic connector 14b. For example, as illustrated in FIG. 2, the upper elastic fixer 14a may be formed in a circular shape, so that the housing 11 is also formed in a cylindrical shape.

A diameter of a side perimeter of the housing 11 may be equal to a diameter of the upper elastic fixer 14a. The upper elastic fixer 14a may be disposed along the circumference of the side wall of the housing 11 and may also be inserted into the side wall of the housing 11.

The upper elastic fixer 14a may be connected to the upper side of the side wall of the housing 11 and spaced apart from the upper case 12 by a predetermined distance. A distance between the upper elastic fixer 14a and the upper case 12 may be greater than a thickness of the upper case 12.

Due to the distance between the upper elastic fixer 14a and the upper case 12, the mass body 131 may not be in contact with the upper case 12 when the mass body 131 rises to a maximum in the housing 11. Related description will be made with reference to FIG. 4.

The upper elastic connector 14b may have one end connected to the upper elastic fixer 14a and another end connected to the upper elastic support 14c. In addition, the upper elastic connector 14b may be an elastic body connecting the upper elastic fixer 14a and the upper elastic support 14c to be inclined in the vertical direction. Also, the upper elastic connector 14b may be resiliently compressed or tensioned.

For example, as illustrated in FIG. 2, the upper elastic connector 14b may include a plurality of elastic connectors diagonally connected between the upper elastic fixer 14a and the upper elastic support 14c.

When the upper elastic support 14c is moved away from or close to the upper elastic fixer 14a, the plurality of elastic connectors may allow the upper elastic connector 14b to generate a resistance in an opposite direction of movement through tension or compression.

Also, angles of the elastic connector relative to the upper elastic fixer 14a and the upper elastic support 14c may increase or decrease. An elastic force generated in such deformation process may act in a direction opposite to a direction in which the vibrator 13 moves.

The upper elastic support 14c may be fixed to the first stepped portion 1311 of the mass body 131 to support the mass body 131 from the upper side and support the mass body 131 to stably move in the vertical direction through tension and compression of the upper elastic connector 14b.

As illustrated in FIG. 2, the upper elastic support 14c may be formed in a circular shape, so that the mass body 131 is formed in a circular shape. For example, the upper elastic support 14c may be smaller in diameter than the upper elastic fixer 14a.

Also, a thickness between an inner circumferential surface and an outer circumferential surface of the upper elastic support 14c may be equal to a length of the first stepped portion 1311 and may be greater than a thickness between an inner circumferential surface and an outer circumferential surface of the upper elastic fixer 14a.

For example, the diameter of the first stepped portion 1311 formed along a circumference of the mass body 131 may be equal to the diameter of the inner circumferential surface of the upper elastic support 14c, so that the upper elastic support 14c is fit and fixed to the first stepped portion 1311.

The lower elastic member 15 may be an elastic body connecting and supporting the lower side of the mass body 131 to allow the vertical vibration of the mass body 131. For example, to stably support the mass body 131, the lower elastic member 15 may have one end connected along a circumference of a lower surface of the mass body 131 and another end connected along the circumference of the inner side wall of the housing 11.

The lower elastic member 15 may have the same structure as that of the upper elastic member 14 and may be smaller in size than the upper elastic member 14.

The lower elastic member 15 may have a circular shape with an empty central portion, and may be formed to be inclined in a vertical direction from one end of the edge to the other end of an opposite side. The lower elastic member 15 may include a lower elastic fixer 15a, the lower elastic support 15c, and a lower elastic connector 15b.

In the housing 11, the lower elastic fixer 15a may be fixed to an edge of the lower surface of the housing 11 and connected to the lower elastic support 15c. For example, as illustrated in FIG. 3, the lower elastic fixer 15a may be formed in a circular shape with an empty central portion, so that the housing 11 is also formed in the cylindrical shape.

A diameter of an outer circumferential surface of the lower elastic fixer 15a may be equal to the diameter of the inner surface of the housing 11. The lower elastic fixer 15a may be disposed to connect a bottom surface of the inner space of the housing 11 and the inner surface of the housing 11.

The lower elastic fixer 15a may be disposed along the lower surface of the housing 11 and a circumferential edge of the inner side wall of the housing 11.

The lower elastic connector 15b may have one end connected to the lower elastic fixer 15a and another end connected to the lower elastic support 15c. In addition, the lower elastic connector 15b may be an elastic body connecting the lower elastic fixer 15a and the lower elastic support 15c to be inclined in the vertical direction. Also, the lower elastic connector 15b may be resiliently compressed or tensioned.

For example, as illustrated in FIG. 3, the lower elastic connector 15b may include a plurality of elastic connectors diagonally connected between the lower elastic fixer 15a and the lower elastic support 15c.

The lower elastic support 15c may be fixed to the third stepped portion 1313 of the mass body 131 to support the mass body 131 from the lower side and support the mass body 131 to stably move in the vertical direction through tension and compression of the lower elastic connector 15b.

The lower elastic support 15c may be formed in a circular shape with an empty space therein. Also, the lower elastic support 15c may be connected and fixed to the third stepped portion 1313 of the mass body 131 formed in the circular shape. For example, the lower elastic support 15c may be smaller in diameter than the lower elastic fixer 15a.

For example, the diameter of the third stepped portion 1313 formed along a circumference of the mass body 131 at the lower surface of the mass body 131 may be equal to the diameter of the inner circumferential surface of the lower elastic support 15c, so that the lower elastic support 15c is fit and fixed to the third stepped portion 1313.

The upper elastic member 14 and the lower elastic member 15 may be formed of a material having a low paramagnetism or diamagnetism. Also, for example, the upper elastic member 14 and the lower elastic member 15 may be made of a material including at least one of a stainless steel, a plastic, and a rubber.

Since the upper elastic member 14 and the lower elastic member 15 simultaneously support the vibrating mass body 131 at the upper side and the lower side, a structural stability may increase, noise may be reduced, and a vibration force may increase when compared to a case in which an elastic member is installed at only one side.

The upper elastic member 14 and the lower elastic member 15 may be connected in a complex structure above and below the vibrator 13. The vibrator 13, the upper elastic member 14, and the lower elastic member 15 may be replaced as a single mass-elastic system.

The coil 16 may form a magnetic field for driving the vibrator 13 using an applied current. For example, a plane coil, a solenoid coil, or an electromagnet coil having a core portion including soft magnetic materials may be used as the coil 15. The coil 16 may be formed in a cylindrical shape.

The controller may control a waveform and a frequency of the current applied to the coil 16 and operate a coil based on a plurality of operation modes. The plurality of operation modes may include, for example, a normal vibration mode and a tapping mode.

When an operation mode is the normal vibration mode, the controller may apply a sine wave having a frequency between 50 hertz (Hz) and 170 Hz to the coil. When an operation mode is the tapping mode, the controller may apply a square wave having a frequency between 1 Hz and 20 Hz to the coil.

According to the tapping mode, an amplitude of a vibration force of a vibrator may change intermittently. Thus, a user may feel a tactile sense of intermittent tapping, which is different from a typical vibration.

Figure 4:
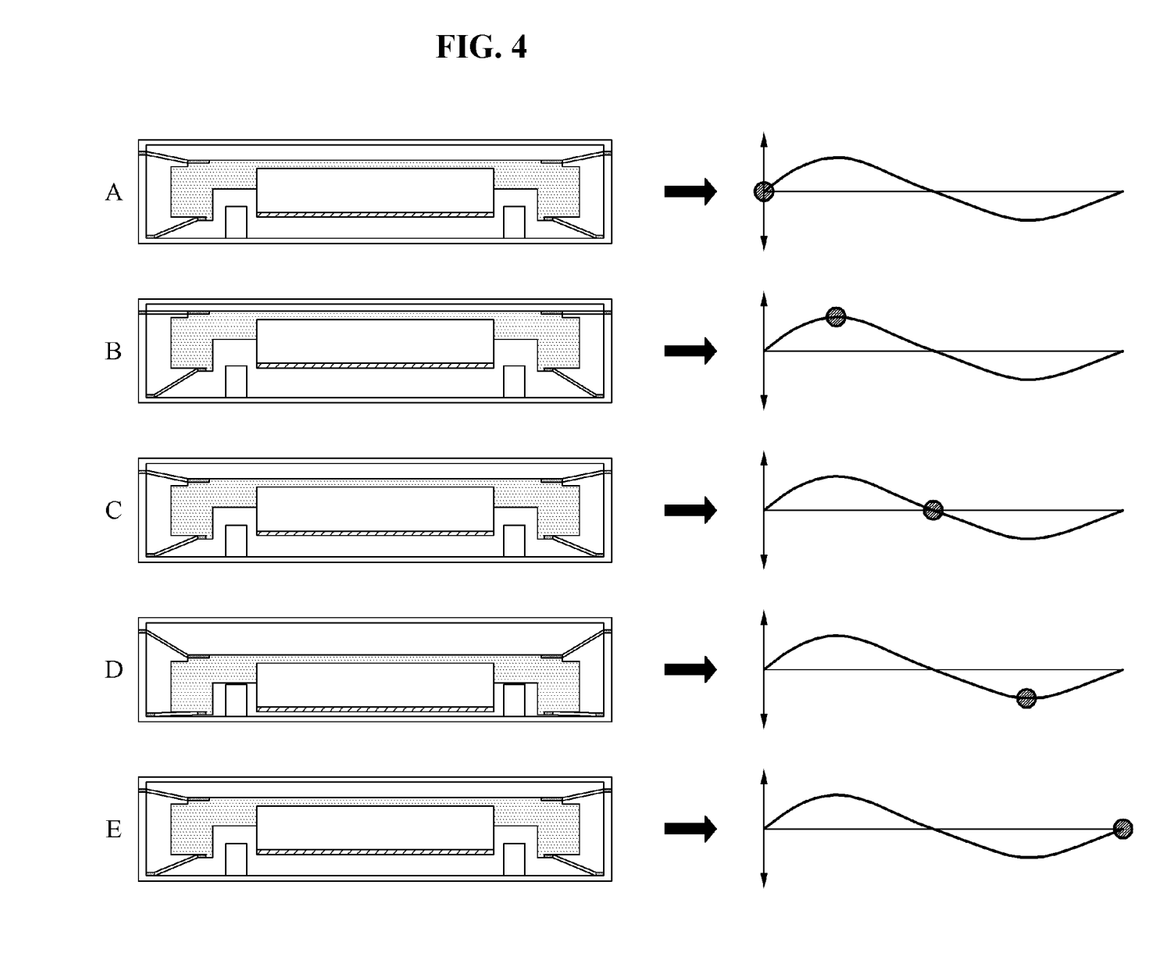
FIG. 4 is a diagram illustrating a vibrator operating vertically in response to a tactile actuator receiving a sine wave according to an example embodiment.

FIG. 4 is a diagram illustrating a vibrator operating vertically in response to a tactile actuator receiving a sine wave according to an example embodiment.

Specifically, a left part shows continuous pictures of the tactile actuator 10 including the mass body 131 that vertically vibrates. A right part shows a graph that represents a displacement of the vibrator 13 of the tactile actuator 10 by lapse of time.

Referring to FIG. 4, the tactile actuator 10 may perform a vibration movement repeated up and down in response to a sine wave being received.

When the tactile actuator 10 receives a sine wave and performs a normal vibration movement, the tactile actuator 10 may perform one cycle of operation returning to a state E corresponding to an initial state over a state B, a state C, and a state D based on a state A corresponding to an initial state.

The state A and the state E may be the same state, and may be a start and an end of the one cycle of vibrating operation. In the state A and the state E, a position of the vibrator 13 may be the same as a position in a basic state in which no force is applied.

The state B may be a state in which the vibrator 13 receives a magnetic field from the coil 16 and rises to a maximum. For example, in the state B, as illustrated in FIG. 4, a height of a top surface of the mass body 131 may be equal to a height of the upper elastic fixer 14a and may be greater than a height of the upper elastic fixer 14a.

In this state, at least a portion of the upper elastic connector 14b may be accepted in the second stepped portion 1312 while the upper elastic connector 14b is not in contact with the mass body 131. Also, when the upper elastic connector 14b is spaced apart from the upper case 12, the mass body 131 may not be in contact with the upper case 12.

In the above structure, the vibrator 13 may not contact the upper elastic connector 14b and the upper case 12 while moving vertically. Through this, a loss of movement of the vibrator 13 may be prevented to increase a tactile sense to be delivered to a user, and noise may be reduced.

The state C may be a state in which the vibrator 13 falls to the same initial position as the states A and E in the state B where the vibrator 13 has risen to the maximum.

The state D may be a state in which the vibrator 13 receives the magnetic field from the coil 16 and moves down to a maximum.

In this state, at least a portion of the lower elastic connector 15b may be accepted by the third stepped portion 1313 while the lower elastic connector 15b is not in contact with the mass body 131.

Also, the mass body 131 and the pole piece 133 may not be in contact with a floor of the housing 11. The coil 16 formed cylindrically may be inserted into a space between the mass body 131 and the magnetic portion 132.

In the above structure, as in the state D of FIG. 4, when the vibrator 13 is fully moved down, the vibrator 13 may not contact the the lower elastic connector 15b and the bottom surface of the housing 11, so as to prevent a loss of movement of the vibrator 13, increase a tactile sense to be delivered to a user, and reduce noise.

Figure 5:
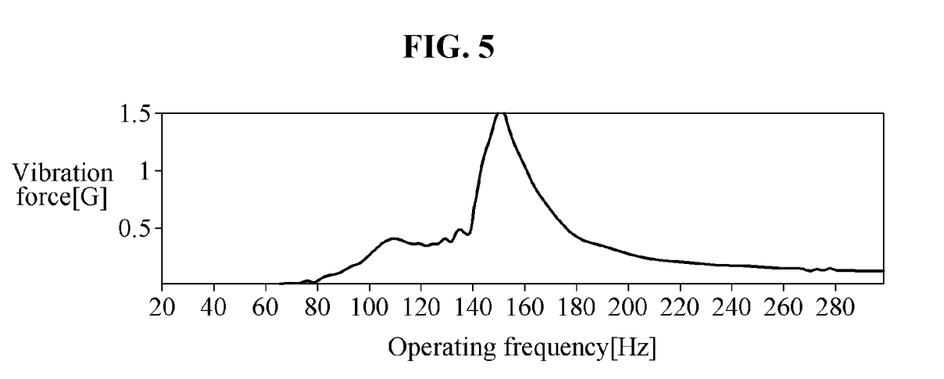
FIG. 5 is a graph illustrating a vibration force based on a magnitude of a frequency of a sine wave applied when a resonance frequency of a tactile actuator is 100 hertz (Hz) to 170 Hz according to an example embodiment.

FIG. 5 is a graph illustrating a vibration force based on a magnitude of a frequency of a sine wave applied when a resonance frequency of a tactile actuator is 100 Hz to 170 Hz according to an example embodiment.

Generally, it is known that a magnitude of a vibration force that a person may perceive a tactile sense is more than 0.2 G. In terms of the tactile actuator 10 having a resonance frequency of 100 Hz to 170 Hz, when a sine wave of a frequency ranging between 100 Hz and 200 Hz is applied, a vibration force of 0.2 G or more may be obtained.

Through tests, it was confirmed that a vibration force of 0.2 G or more can be transmitted to a user by applying a sine wave ranging between 100 Hz and 200 Hz to: the tactile actuator 10 having a mass of a vibrator 131 of 1.15 grams (g), an elastic modulus of 0.45 (N/mm), and a resonance frequency of 100 Hz; and the tactile actuator 10 having a mass of the vibrator 131 of 1.15 g, an elastic modulus of 1.31 N/mm, and a resonance frequency of 170 Hz.

Accordingly, it can be seen that the tactile actuator 10 has a wide operating frequency band.

Figure 6:
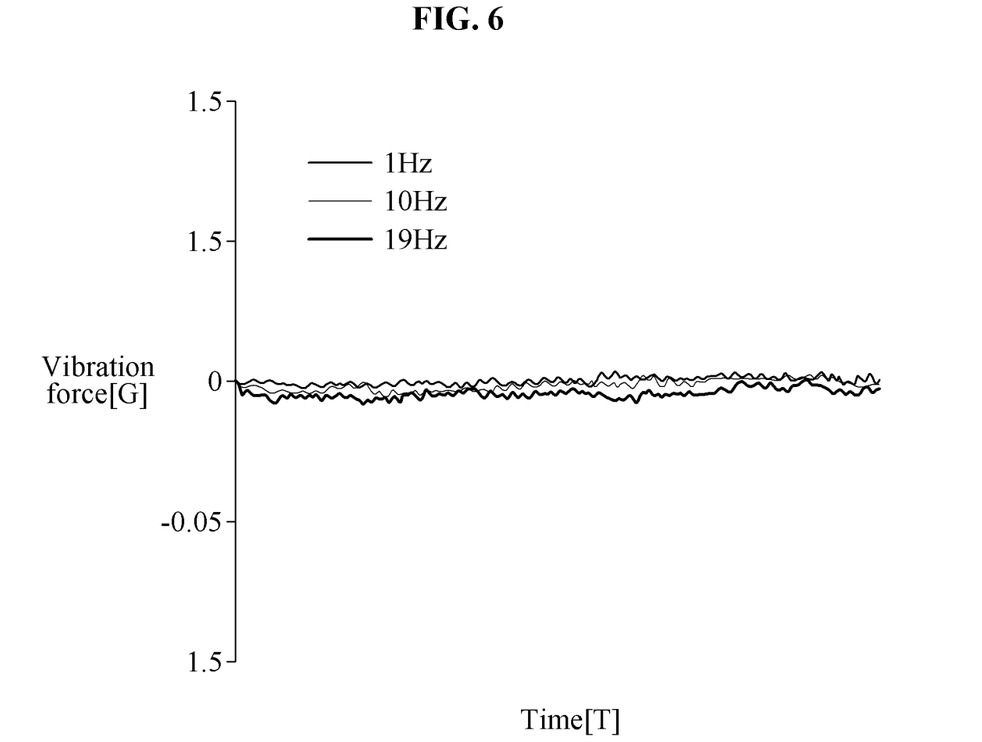
FIG. 6 is a graph illustrating a vibration force measured when a sine wave having a frequency less than 20 Hz is applied to a tactile actuator according to an example embodiment.

FIG. 6 is a graph illustrating a vibration force measured when a sine wave having a frequency less than 20 Hz is applied to a tactile actuator according to an example embodiment.

Referring to FIG. 6, when sine waves of 1 Hz, 10 Hz, and 19 Hz are applied to the tactile actuator 10, a vibration force less than 0.01 G is generated.

Accordingly, it can be known that a noise response which is not recognizable by a person is observed when a sine wave of 20 Hz or less is input to the tactile actuator 10.

Figure 7:
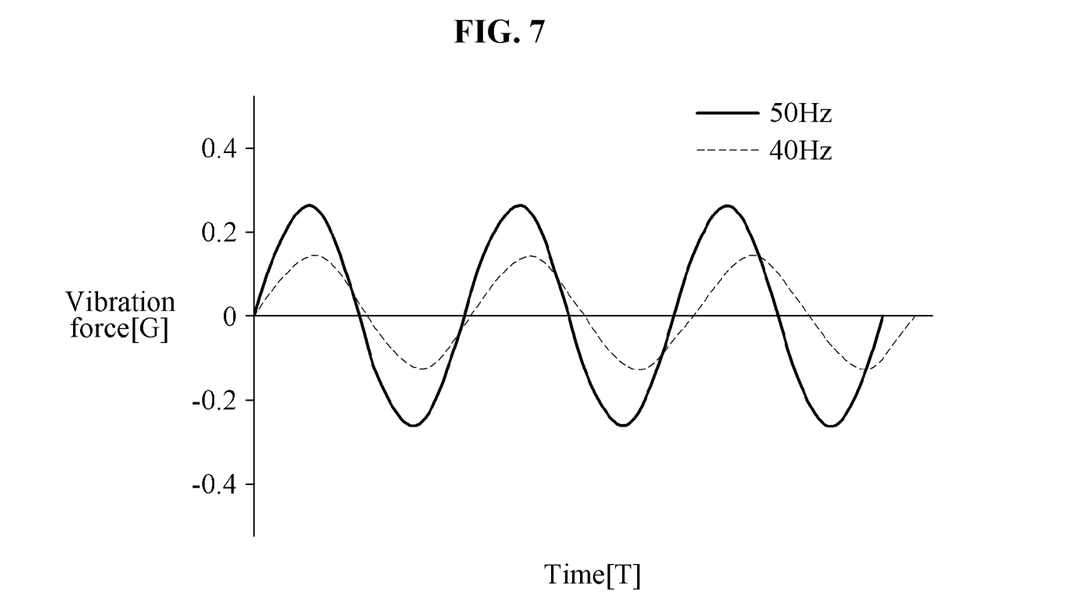
FIG. 7 is a graph illustrating a vibration force measured when a sine wave of 40 Hz and a sine wave of 50 Hz are applied to a tactile actuator according to an example embodiment.

FIG. 7 is a graph illustrating a vibration force measured when a sine wave of 40 Hz and a sine wave of 50 Hz are applied to a tactile actuator according to an example embodiment.

Referring to FIG. 7, when a sine wave of 50 Hz is applied to the tactile actuator 10, a vibration force exceeds 0.2 G. Also, when a sine wave of 40 Hz is applied to the tactile actuator 10, the vibration force is less than 0.2 G.

Accordingly, it can be known that when inputting a sine wave to the tactile actuator 10, a sine wave of 50 Hz or more may need to be applied to provide a tactile sense that can be perceived by a person.

Figure 8:
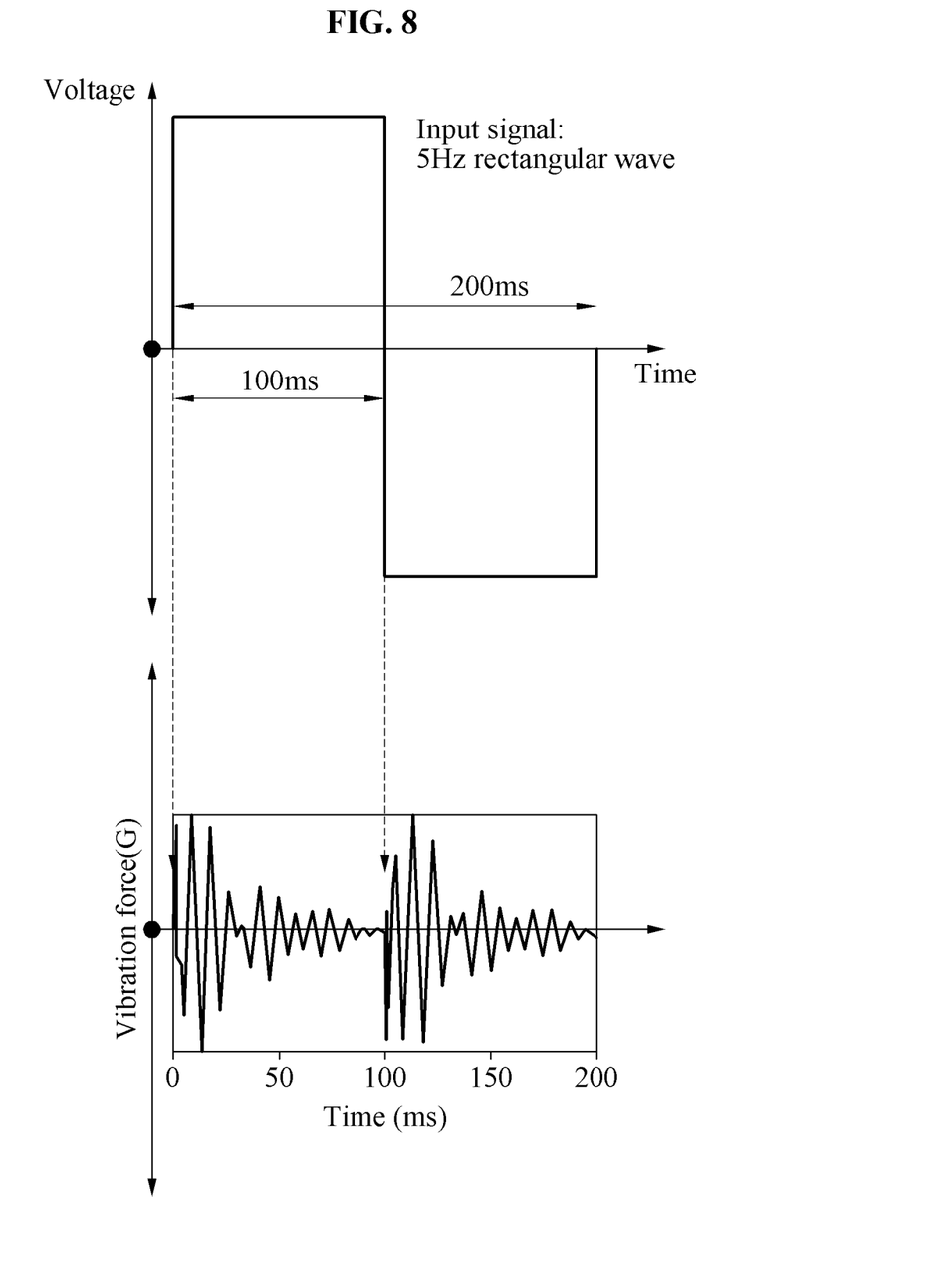
FIG. 8 illustrates graphs representing a vibration response corresponding to tapping formed when a square wave of 5 Hz is applied to a tactile actuator according to an example embodiment.

FIG. 8 illustrates graphs representing a vibration response corresponding to tapping formed when a square wave of 5 Hz is applied to a tactile actuator according to an example embodiment. A first graph of FIG. 8 shows a square wave having a frequency of 5 Hz applied for one period. A second graph of FIG. 8 shows a vibration force G provided to a user from a tactile actuator when a square wave having a frequency of 5 Hz and a voltage of 2 volts (V) is applied.

Referring to FIG. 8, when a square wave having an ultra-low frequency band of 1 Hz to 20 Hz is applied to the tactile actuator 10, a vibration response different from a typical vibration is formed.

Through the vibration response, the tactile actuator 10 may provide a tactile sense of "tapping" to a user. That is, it may be understood that FIG. 8 shows the tactile actuator 10 driven in a "tapping mode".

Referring to the graph in a lower part of FIG. 8, in the vibration response driven in the tapping mode, a magnitude of an amplitude in a waveform of a vibration force varies for each cycle over time. The magnitude of the amplitude may exponentially decrease during a half period. For example, the magnitude of the amplitude may have a large value for a relatively short period of time (about 20 milliseconds (ms)) in an early stage, and decrease sharply in an intermediate stage and a late stage. In accordance with such an abrupt difference in amplitude, the user may sense an intermittent tapping which is different from a normal vibration.

Figure 9:
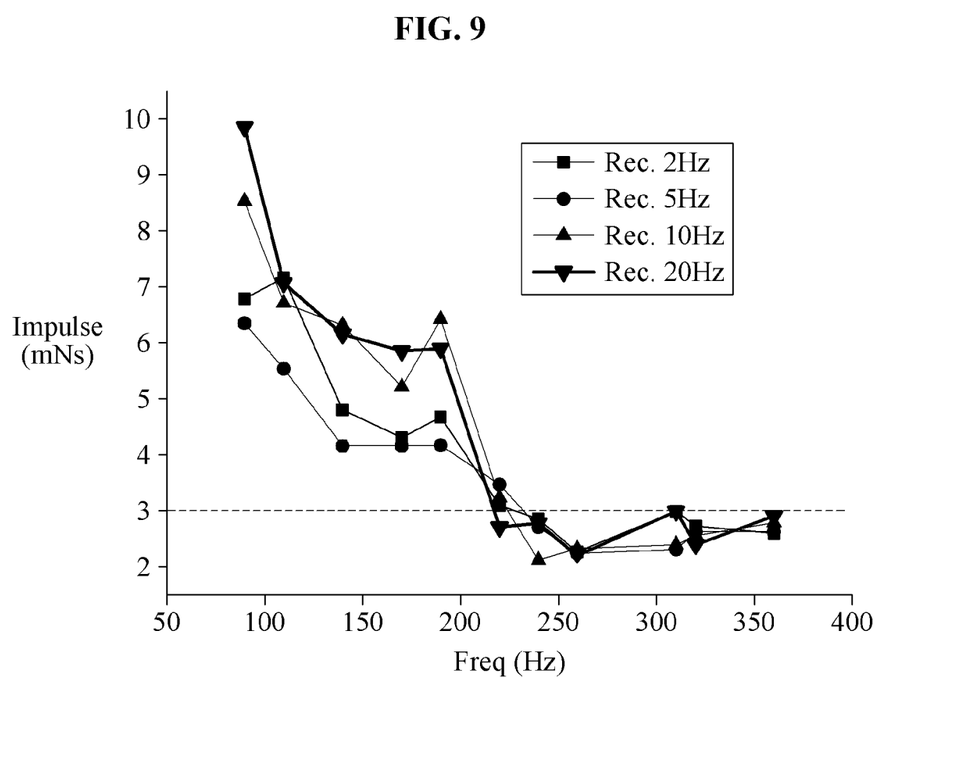
FIG. 9 is a graph illustrating an impulse generated when a square wave less than 20 Hz is applied to a tactile actuator having various resonance frequencies according to an example embodiment.

FIG. 9 is a graph illustrating an impulse generated when a square wave less than 20 Hz is applied to a tactile actuator having various resonance frequencies according to an example embodiment.

FIG. 9 illustrates a graph representing an impulse. Specifically, when square waves corresponding to 2 Hz, 5 Hz, 10 Hz, and 20 Hz are applied to tactile actuators having various resonance frequencies between 80 Hz and 360 Hz, the impulse may be obtained by measuring a vibration force for 50 ms after applying the corresponding waveform, and then integrating the measured vibrating force within an interval of 50 ms.

The impulse may be obtained by integrating the vibration force about 50 ms as shown in Equation 1 below.

$$(\text{Impulse}) = \int_{t_0}^{t_0+50ms} F dt \qquad [\text{Equation 1}]$$

In Equation 1, $t_0$ may be a time of an input instant of waveform.

According to "Robotic Tactile Sensing Technologies and System, Springer", a minimum time for a person to distinguish between two stimuli is 30 ms to 50 ms. Also, as a result of measurement for adults in their 20 s to 40 s, it is confirmed that an impulse of 3 mNs or more was needed in an interval between 0 ms to 50 ms in order to recognize a tapping with a finger.

In order to obtain a desired tapping effect from the tactile actuator 10, a square wave having a minimum limit frequency of 20 Hz or less, at which a tactile sense corresponding to a normal vibration is provided, may be applied as described with reference to FIG. 11. Also, it is confirmed that an impulse accumulated for an interval of 50 ms, which is a minimum time for an ordinary person to distinguish the two stimuli, is 3 mNs or more.

Referring to FIG. 9, it can be seen that an impulse of 3 mNs appears for all square waves below 20 Hz input to the tactile actuator 10 in all cases in which a resonance frequency of the tactile actuator 10 is 100 Hz to 170 Hz. In practice, in the above case, a user of the tactile actuator 10 recognized the tactile sense of tapping. On the other hand, when a resonance frequency of the tactile actuator 10 is 170 Hz or more, the impulse decreases sharply. In this case, the user hardly feels the tactile sense at a frequency of 230 Hz or more.

Therefore, in order for the tactile actuator 10 to be driven in the tapping mode, the tactile actuator 10 may have the resonance frequency of 100 Hz to 170 Hz.

In a case of a tactile actuator having a resonance frequency less than 100 Hz, there is a limitation in applying a sufficiently high voltage due to noise occurring when an overly flexible elastic member collides with an inner wall of a housing. Thus, when a tapping mode is to be implemented, an impulse integrated in a half period of a square wave is less than 3 mNs, so that the user may not recognize the tactile sense. In other words, in order to apply a high voltage sufficient to provide the tactile sense of tapping, a resonance frequency of the tactile actuator 10 may need to be 100 Hz or more.

Figure 10:
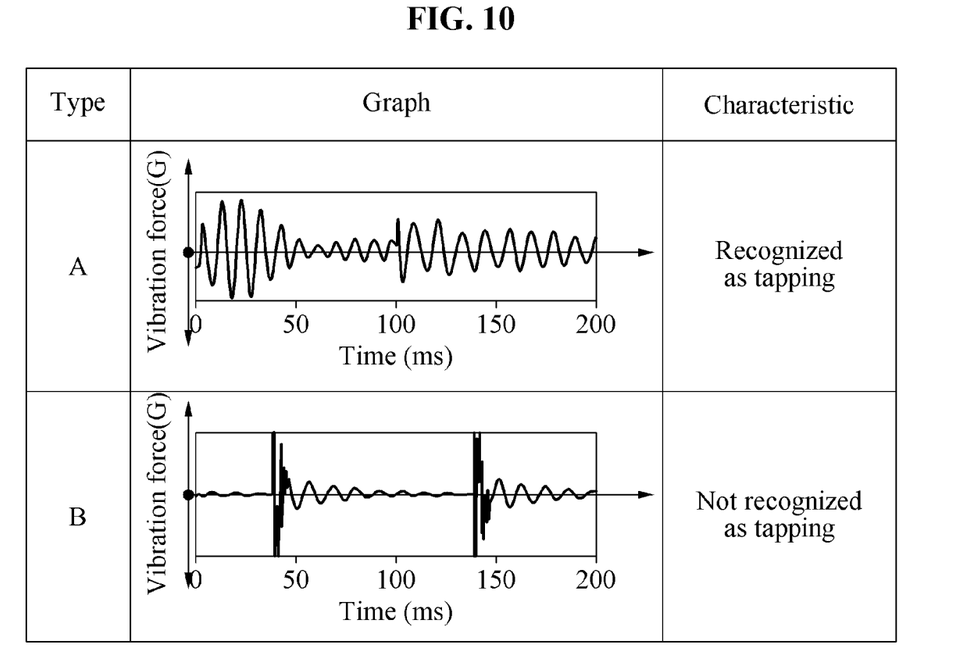
FIG. 10 illustrates graphs representing vibration responses formed when a square wave less than 5 Hz is applied to tactile actuators having different resonance frequencies according to an example embodiment.

FIG. 10 illustrates graphs representing vibration responses formed when a square wave less than 5 Hz is applied to tactile actuators having different resonance frequencies according to an example embodiment. A type A may represent a vibration response in a case in which a resonance frequency of the tactile actuator 10 is 150 Hz which is less than 170 Hz. A type B may represent a vibration response in a case in which a resonance frequency of the tactile actuator 10 is 190 Hz which is higher than 170 Hz.

Referring to FIG. 10, when a sum of impulse in an interval of 50 ms exceeds 3 mNs as shown in the type A, a user may feel a tactile sense of tapping.

On the other hand, as a case of a vibration response having a high attenuation close to an impulse, when the sum of impulse in an interval of 50 ms does not exceed 3 mNs as shown in the type B, the user may not not feel the tactile sense of tapping.

Figure 11:
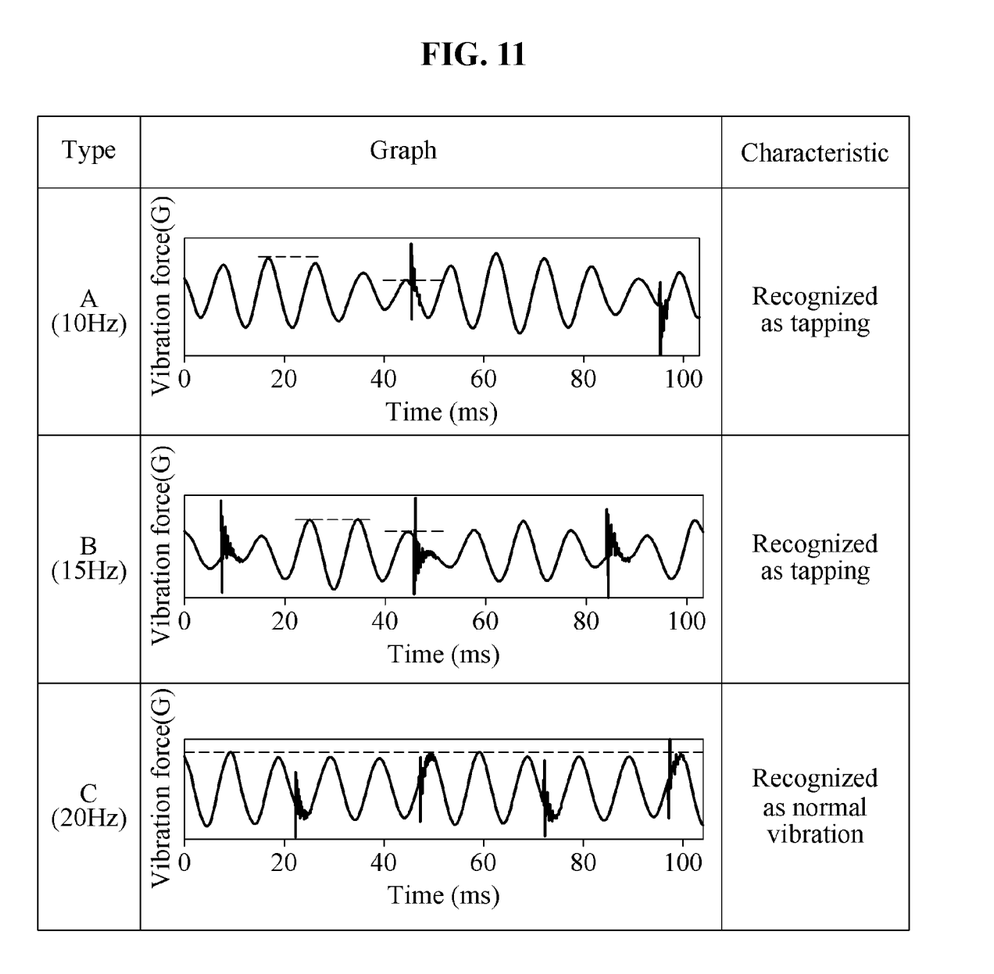
FIG. 11 illustrates graphs representing vibration responses formed when a square wave less than 20 Hz is applied to tactile actuators having the same resonance frequency according to an example embodiment.

FIG. 11 illustrates graphs representing vibration responses formed when a square wave less than 20 Hz is applied to tactile actuators having the same resonance frequency according to an example embodiment.

Specifically, FIG. 11 illustrates graphs of a type A, a type B, and a type C which represent vibration forces measured when square waves of 10 Hz, 15 Hz, and 20 Hz are input to the tactile actuator 10.

Referring to FIG. 11, in the types A and B, as indicated by dashed lines, a magnitude of an amplitude of a vibration force, that is, a height of a peak point varies over time. For example, a difference in height between peak points of an amplitude may be 0.1 G or more. Also, a minimum time in which a difference in height between peak points of the amplitude is greater than 0.1 G may be greater than or equal to a minimum time in which a person distinguishes two stimuli at a fingertip, for example, at least 30 ms. In the types A and B, it was confirmed that the user recognizes a tactile sense corresponding to tapping.

In the type C, an interval of a period may be within the minimum time in which a person distinguishes two stimuli at a fingertip, for example, 30 ms. Also, as indicated by dashed lines, a difference in height of peak points of an amplitude is less than 0.1 G. In this case, the user may recognize a normal vibration instead of the tapping.

Therefore, in order to drive the tactile actuator 10 in a tapping mode, a square wave of less than 20 Hz, for example, at most 15 Hz may be applied. In other words, when a frequency of the square wave exceeds 20 Hz, even if the square wave is applied, a waveform of a sine wave may appear, so that the user may recognize the normal vibration instead of the tapping.

A number of example embodiments have been described above. Nevertheless, it should be understood that various modifications may be made to these example embodiments.

For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A tactile actuator comprising:
a housing having an accommodation space therein;
an upper case configured to cover an upper portion of the accommodation space;
a vibrator disposed in the accommodation space;
an upper elastic member configured to connect an upper side and the vibrator; and
a coil configured to form a magnetic field to drive the vibrator, wherein one end portion of the upper elastic member is fixed at a position spaced apart from the upper case on a side wall of the housing,
wherein the vibrator comprises:
a mass body connected to the upper elastic member and having a magnetic property, and
wherein the mass body comprises:
a first stepped portion downwardly recessed from an edge of a top surface of the mass body, the first stepped portion being disposed outwardly from a center of a top surface of the mass body such that the first stepped portion does not overlap with the top surface of the mass body; and
a second stepped portion downwardly recessed from the first stepped portion, the second stepped portion being disposed outwardly from the first stepped portion, and
the upper elastic member comprises:
an upper elastic fixer fixed to the upper side of the housing;
an upper elastic support fit into the first stepped portion; and
an upper elastic connector configured to connect the upper elastic fixer and the upper elastic support.

2. The tactile actuator of claim 1, further comprising:
a lower elastic member configured to connect a lower side of the housing and the vibrator, wherein the vibrator further comprises:
a magnetic portion provided at a center of a lower side of the mass body; and
a pole piece attached to a bottom surface of the magnetic portion.

3. The tactile actuator of claim 2, wherein when the mass body reaches a maximum height, the second stepped portion is not interfered with by the upper elastic connector.

4. The tactile actuator of claim 3, wherein the mass body further comprises a third stepped portion upwardly recessed from an edge of a bottom surface of the mass body, and the lower elastic member comprises: a lower elastic fixer fixed to the lower side of the housing; a lower elastic support fit into the third stepped portion; and a lower elastic connector configured to connect the lower elastic fixer and the lower elastic support.

5. The tactile actuator of claim 4, wherein when the mass body reaches a minimum height, the third stepped portion is not interfered with by the lower elastic connector.

6. The tactile actuator of claim 1, wherein the upper elastic fixer is spaced apart from the upper case by a distance greater than a thickness of the upper case.

7. The tactile actuator of claim 1, wherein the upper elastic fixer is spaced apart from the upper case by a distance greater than a thickness of the upper case.

8. The tactile actuator of claim 1, wherein a natural vibration frequency of the tactile actuator is 100 hertz (Hz) to 170 Hz.

9. The tactile actuator of claim 8, further comprising: a controller configured to determine an operation mode among a plurality of preset operation modes and determine a characteristic of a current to be applied to the coil based on the operation mode, wherein the operation mode includes a normal vibration mode and a tapping mode, when the operation mode is the normal vibration mode, the controller applies a sine wave having a frequency between 50 Hz and 170 Hz to the coil, and when the operation mode is the tapping mode, the controller applies a square wave having a frequency of 1 Hz or more and less than 20 Hz to the coil.

10. The tactile actuator of claim 9, wherein, in the tapping mode, a cumulative impulse of the vibrator is 3 mNs or more within an interval of 50 milliseconds (ms).

11. The tactile actuator of claim 9, wherein a magnitude of an amplitude of a vibrating force of the vibrator varies over time and a minimum time interval, in which a difference in height between peak points of the amplitude of the vibrating force of the vibrator is greater than 0.1 G, is greater than a minimum time in which a person distinguishes two stimuli at a fingertip.

12. The tactile actuator of claim 1, further comprising: a controller configured to apply a current to the coil and determine a characteristic of a current to be applied, wherein when the controller applies a square wave having a frequency between 1 hertz (Hz) to 20 Hz, a cumulative impulse of the vibrator is 3 mNs or more within an interval of 50 milliseconds (ms).

* * * * *